United States Patent [19]

Yang

[11] 4,400,490

[45] Aug. 23, 1983

[54] NYLON COMPOSITIONS AND RIM PROCESS FOR MAKING SAME

[75] Inventor: Wei-Yeih W. Yang, Maple Heights, Ohio

[73] Assignee: The B.F. Goodrich Company, Akron, Ohio

[21] Appl. No.: 340,179

[22] Filed: Jan. 18, 1982

[51] Int. Cl.³ .................... C08G 69/16; C08G 69/24
[52] U.S. Cl. .................... 525/423; 264/240; 525/408; 525/409; 525/430; 525/533; 528/116; 528/117; 528/118; 528/323
[58] Field of Search ............ 264/240; 528/116, 117, 528/118, 323; 525/408, 409, 423, 430, 533

[56] References Cited

U.S. PATENT DOCUMENTS

| | | | |
|---|---|---|---|
| 2,847,341 | 8/1958 | Kohn | 528/117 |
| 2,847,342 | 8/1958 | Kohn | 528/117 |
| 2,847,343 | 8/1958 | Kohn | 528/117 |
| 3,622,540 | 11/1971 | Hashimoto et al. | 528/323 |
| 3,642,974 | 2/1972 | Jacobi et al. | 528/323 |
| 3,644,296 | 2/1972 | Bosch | 528/323 |
| 3,838,976 | 10/1974 | Bosch | 528/323 |
| 4,309,373 | 1/1982 | Althausen et al. | 264/240 |

*Primary Examiner*—Lester L. Lee
*Attorney, Agent, or Firm*—George A. Kap

[57] ABSTRACT

Nylon compositions are prepared by anionic polymerization of at least 75% of a lactam with up to about 25% of an epoxy component in the presence of a basic catalyst and a promoter that can be used in lactam polymerization wherein, in a preferred embodiment, the epoxy component is a modified epoxy resin containing physical property enhancing constituents. The nylon compositions are prepared by mixing a fraction of a lactam with the epoxy component and the promotor to form liquid mixture A, mixing remaining lactam with the catalyst to form liquid mixture B, mixing liquid mixtures A and B in the ratio ranging from 1/1 to 4/1 to form liquid mixture C, injecting liquid mixture C into a mold maintained at a temperature of about 100° to 200° C. wherein a chemical reaction takes place whereby the liquid is converted to a solidified mass in less than about 2 minutes, and removing the nylon composition in the form of a molded object.

18 Claims, No Drawings

NYLON COMPOSITIONS AND RIM PROCESS FOR MAKING SAME

BACKGROUND OF THE INVENTION

Reaction injection molding (RIM) is a low pressure one-step or one-shot injection of liquid components into a closed mold where rapid polymerization occurs resulting in a molded plastic product. RIM differs from injection molding in a number of important respects. Injection molding is conducted at pressures of about 10,000 to 20,000 psi in the mold cavity by melting a solid resin and conveying it into a mold maintained at room temperature and the molten resin at about 150° to 350° C. At injection temperature of about 150° to 350° C., viscosity of the molten resin in an injection molding process is generally in the range of 50,000 to 1,000,000 and typically about 200,000 cps. In injection molding process, solidification of the resin occurs in about 10 to 90 seconds, depending on the size of the molded product, following which, the molded product is removed from the mold. There is no chemical reaction taking place in an injection molding process when the resin is introduced into a mold.

In a RIM process, viscosity of the materials fed to a mold is about 50 to 10,000 cps, preferably about 1500 cps, at injection temperatures varying from room temperature for urethanes to about 150° C. for lactams. Mold temperatures in a RIM process are in the range of about 100° to 200° C. and pressures in the mold are generally in the range of about 50 to 150 psi. At least one component in the RIM formulation is a monomer that is polymerized to a polymer in the mold. The main distinction between injection molding and RIM resides in the fact that in RIM, a chemical reaction takes place in the mold to transform a monomer to a polymeric state. For practical purposes, the chemical reaction must take place rapidly in less than about 2 minutes for smaller items.

Although urethanes are the only commercial materials currently available for RIM processing, systems based on the use of nylons are being developed due to serious disadvantages of the urethane systems. Among the significant advantages of the nylon systems over the urethanes include the fact that nylons do not require mold release nor off-line painting.

Polymerization of a lactam to give a nylon, i.e., a polyamide, has been known for many years. The earliest processes for this polymerization were slow, requiring several hours, and involved the use of water or acidic reagents as polymerization catalysts. Subsequent work showed that anhydrous lactam could be polymerized above 200° C. in the presence of strongly basic materials, particularly the alkali and alkaline earth metals, their hydrides, hydroxides, alkoxides, oxides, alkyls or amides. More recently, it has been disclosed that the base-catalyzed polymerization of a lactam can be accelerated by the addition of certain compounds that function as promoters. Particularly effective promoters which have been disclosed include acylating agents such as acyl halides, anhydrides and the like; isocyanates and compounds containing tertiary nitrogen having at least two of the three substituents on the nitrogen atom consisting of carbonyl, thiocarbonyl, sulfonyl, phosphenyl, thiophosphenyl and nitroso radicals.

There are a number of pertinent prior art references that relate to the subject matter disclosed herein. U.S. Pat. No. 3,396,145 to Gruenwald discloses epoxy resins cured with 5 to 10% of a lactam and 15 to 65% of a polyfunctional aliphatic acid or anhydride that have good low and high temperature flexibility. U.S. Pat. No. 3,880,948 to Chompff discloses high impact nylon compositions that are prepared by blending nylon with a reaction product of a carboxyl terminated reactive liquid polymer and an epoxy resin. U.S. Pat. No. 3,763,077 to Troy et al discloses anionic polymerization of caprolactam in presence of a polymethylene polyphenyl isocyanate promoter and a polyoxyalkylene polyol plasticizer to form a high impact nylon. U.S. Pat. No. 3,366,608 to Lincoln et al describes polymerization of caprolactam in the presence of an alkaline catalyst, a diacyl biscaprolactam and triethylene tetramine to produce nylon of improved impact strength. The Hedrick et al. U.S. Pat. Nos. 3,944,629, 4,031,163 and 4,034,015 relate to preparation of terpolymers of a lactam, a polyol and an acyl or polyacyl polylactam by anionic polymerization to form nylon of improved impact strength. General Electric has at least one patent on an all-epoxy RIM system wherein reaction proceeds by cationic polymerization.

SUMMARY OF THE INVENTION

This invention relates to a composition that is a reaction product of at least 75% lactam and up to about 25% epoxy component and to a reaction injection molding process comprising the steps of mixing a first liquid mixture of a lactam, epoxy component and a promoter with a second liquid mixture of a lactam and a catalyst to form a third liquid mixture, conveying the third mixture to a mold maintained at a temperature of about 100° to 200° C. wherein a chemical reaction takes place whereby the lactam and the epoxy are polymerized to a solid state within less than 2 minutes, and extracting a solid molded object from the mold. The epoxy component can be a monomer or a resin that contains property enhancing constituents for improving properties such as impact strength, fire retardancy, flexural modulus, and ease of cross-linking to lessen creep and raise heat distortion temperature. These compositions can provide higher impact strength without reducing flexural modulus.

DETAILED DESCRIPTION OF THE INVENTION

The compositions described herein can be prepared to provide improved impact strength, fire retardancy, flexural modulus, and ease of crosslinking that results in lessened creep and higher heat distortion temperature. What is unexpected herein is the fact that impact strength can be improved while maintaining flexural modulus or at times, even slightly increasing it. This phenomenon contradicts normal expectations that are based on the established fact that flexural modulus declines when impact strength is increased, without resorting to the use of reinforcement materials.

To overcome notorious brittleness and other disadvantages of nylons, it is proposed to prepare nylon compositions by polymerizing a lactam with an epoxy in presence of a basic catalyst and a suitable promoter. The epoxy component can be an epoxy monomer, such as a diepoxy compound, or a polymeric product in the form of an epoxy resin that contains one or more free epoxy group. The epoxy resin can contain property enhancing constituents that become a part of the nylon polymer upon polymerization of the lactam with the epoxy. Being disposed in the backbone of the nylon polymer and thereby being an integral part thereof, the property enhancing constituents are not extractable by physical means and thus contribute to the stability of the polymer. Furthermore, it is axiomatic that for use in a reaction injection method, polymerization must take place quickly in a matter of less than 2 minutes and no by-products must be produced, meaning that polymerization must be of the addition type.

The proposed anionic polymerization of a lactam and an epoxy by the reaction injection molding process is out of character when viewed from the perspective of epoxy polymerization. Preferred polymerization of epoxies is by the cationic route. It was, therefore, totally unexpected to discover that anionic polymerization of a lactam and an epoxy could be easily carried out in less than about 2 minutes, which eminently qualified it for the reaction injection molding process.

The reaction described herein is carried out by polymerizing at least 75% and up to about 98% by weight of a lactam with up to about 25% by weight but more than 2% of an epoxy, based on the combined weight of lactam and epoxy. Too much epoxy will slow down the reaction and therefore, such a condition should be avoided in a reaction injection molding process. In a preferred embodiment, amount of lactam is about 80 to 95%, with epoxy being 5 to 20%, at a level of about 1 mole percent of a basic catalyst and about 1 mole percent of a promoter. Generally, however, amount of catalyst can be in the range of a fraction of one mole percent to 20 mole percent and that of promoter in the range of a fraction of one mole percent to 20 mole percent.

The lactams suitable for anionic polymerization with an epoxy include compounds defined by the formula

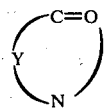

where Y is an alkylene group containing 3 to 14 carbon atoms, preferably about 5 to 11. Although the preferred lactam is epsilon-caprolactam that yields nylon-6 on polymerization, examples of other suitable lactams include pyrrolidone, piperidone, valerolactam, lauryllactam, and the like. In addition to lactams that are unsubstituted on their carbon chains, also included within the scope of this invention are lactams with substituents on the carbon chain that do not inhibit or otherwise adversely affect the polymerization reaction.

Suitable epoxy component for the invention described herein has an average of about two epoxy groups per molecule, but can range from 1.0 to 4, with a viscosity of the preferred embodiments being in the range of about 50 to 20,000 cps, most preferably about 1500 cps, measured at 25° C. These materials can be prepared by reacting a hydroxy alcohol or phenol with an epihalohydrin. Examples of hydroxy alcohols or phenols include hydroquinone, resorcinol, glycerine and the various phenol condensation products. The reaction of epichlorohydrin with bis-(4-hydroxyphenyl)-2,2-propane, known also as bisphenol A, in the presence of a basic catalyst, is a typical example of such reactions. Of course, other epihalohydrins or bisphenols can be used, the latter containing an intermediate alkylene or alkylidene group of 1 to 6 carbon atoms unsubstituted or substituted with at least one halogen, especially fluorine. Also useful in connection with this invention are the epoxylated novolac resins which are derived from polyfunctional phenols of the novolac type. Epoxidation of olefins using peroxides or peracids also yields epoxy compounds.

Epoxy component can be selected from monomeric epoxy compounds such as resorcinol diglycidyl ether, diglycidyl ether of bisphenol A, vinyl cyclohexane dioxide, 3,4-epoxy-6-methylcyclohexylmethyl and 3,4-epoxy-6-methylcyclohexanecarboxylate, and butanediol diglycidyl ether.

Suitable epoxy components also include polymeric epoxy resins that contain at least one epoxy group per molecule, and preferably from about 1.7 to about 4. The epoxy resins may be liquids or low-melting solids but preferably are liquids having bulk viscosity of about 200 to 2,000,000 centipoises, measured at 25° C. using a Brookfield RVT viscometer. The epoxy resins can have an epoxy equivalent weight, i.e., gram molecular weight per epoxy group, of about 70 to 6,000, more typically about 70 to 2,000. Suitable noncycloaliphatic epoxy resins include epoxidized cyclic silane, epoxidized soybean oil, polyglycidyl esters of polycarboxylic acid, epoxidized polyolefins, and glycidyl ether resins. A non-cycloaliphatic epoxy resin is defined as a resin in which an epoxy group is not itself a part of a cycloaliphatic ring structure. Examples of suitable polyglycidyl esters of polycarboxylic acids include the diglycidyl ester of linoleic dimer acid, the triglycidyl ester of linoleic trimer acid, and the like. Suitable glycidyl ether resins include polyallyl glycidyl ether, the diglycidyl ether of chlorendic diol, the diglycidyl ether of dioxanediol, the diglycidyl ether of endomethylene cyclohexanediol, epoxy novolac resins, alkanediol diglycidyl ethers, alkanetriol triglycidyl ethers, and di- and polyglycidyl ethers of bisphenols. Also included herein are the cycloaliphatic epoxy resins in which the epoxy group is itself a part of the cycloaliphatic structure. Such cycloaliphatic resins include bis(2,3-epoxycyclopentyl)-ether, dicyclopentadiene dioxide, the bis-(epoxydicycloentyl)ether of ethylene glycol, 3,4-epoxycyclohexylmethyl-(3,4-epoxy)-cyclohexane carboxylate, bis(3,4-epoxy-6-methylcyclohexylmethyl)adipate, and the like.

In the context of this invention, of special significance are the modified epoxy resins that contain property enhancing constituents. For instance, for impact enhancement of the nylon compositions herein, an epoxy resin can be prereacted with an impact modifying material to yield a modified epoxy resin containing at least one free epoxy group per molecule which is then polymerized with a lactam, as already described. Examples of impact modifying materials are the various reactive liquid polymers such as carboxyl terminated, amine terminated reactive liquid polymers, and any other functionally terminated reactive liquid polymers wherein the functional group can react with an epoxy group. Such liquid polymers generally comprise about 2 to 4 mole percent functional-providing unis, about 50 to 98% mole percent of olefinic hydrocarbon monomers, and about 0 to 48 mole percent of monomers selected from acrylates, methacrylates and nitriles. Preferred liquid polymers consist of 0 to 30% by weight acrylonitrile, 0 to 10% by weight acrylic or methacrylic acid, with remainder being butadiene or isoprene. These liquid polymers can have functional groups at terminal as well as pendant positions along the molecule chain.

Specific examples of functionally terminated reactive liquid polymers that can be used to modify epoxies include carboxyl terminated butadiene liquid polymer, carboxyl terminated butadiene-acrylonitrile liquid polymer containing about 15% acrylonitrile, and amine terminated butadiene-acrylonitrile liquid polymer containing about 15% acrylonitrile.

The reaction between an epoxy and a functionally terminated liquid polymer can be carried out in the temperature range of 70° to 120° C., although the reaction will proceed slowly even at room temperature. Duration of the reaction is one-half hour to one and one-half hours, with relative amount of the liquid polymer and the epoxy being controlled to provide epoxy/functional group ratios in the range of 1.5/1 to 3/1. Suitable catalysts for this reaction include tetraalkyl ammonium salts, tertiary amines, aromatic amines, and heterocyclic nitrogen compounds.

Other physical properties of the nylon compositions disclosed herein can also be improved by prereacting an epoxy with a property enhancing material and then polymerizing a lactam with the modified epoxy. For instance, brominated bisphenol A can be reacted with epichlorohydrin to produce a modified epoxy resin and then this resin can be reacted with a lactam to produce a nylon composition having fire retardant property. This approach is much more effective than one where a fire retardant is blended into the composition since the fire retardant constituents herein comprise an integral part of the polymeric unit. For this reason, the physical property enhancing constituent cannot be leached out or physically extracted as in the case where the additive is blended into composition.

Specific examples of suitable epoxy components are Der 332, Der 431, Der 438, Der 542, and Der 732 epoxy resins sold by Dow Chemical Company. Der 332 is a bisphenol A derived epoxy resin, Der 431 and Der 438 are novolac derived epoxy resins, Der 542 is a tetrabromo bisphenol A derived diepoxide, and Der 732 is a polypropylene oxide derived epoxy resin. Example of another epoxy component is the Kelpoxy resin, solid by Spencer Chemicals, a modified epoxy resin made from a carboxyl terminated reactive liquid polymer and diglycidyl ether bisphenol A. The table below provides additional data relative to the epoxy components mentioned above:

| Epoxy Component | Epoxy Eq. Wt.[3] | Visc. (cps.) |
|---|---|---|
| Der 332 | 172–176 | 4,000–6,000[1] |
| Der 431 | 172–179 | 1,000–1,700[2] |
| Der 438 | 176–181 | 20,000–50,000 |
| Der 542 | NA | NA |
| Der 732 | 305–335 | 55–100[1] |
| Kelpoxy | 340 | 7,000[1] |

[1] viscosity measured at 25° C.
[2] viscosity measured at 125° C.
[3] in moles of epoxy function per 100 grams of epoxy component
NA indicates that data is not available The anionic polymerization catalyst useful herein is selected from the class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates and the like. Also useful are a number of organometallic compounds of the metals mentioned above such as metal alkyls, metal phenyls, metal amides and the like. Examples include sodium hydride, potassium hydroxide, lithium oxide, ethyl magnesium bromide, phenyl magnesium bromide, calcium fluorohydride, strontium carbonate, barium hydroxide, methyl sodium, butyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can, therefore, be formed in situ by reaction of one of the foregoing metal or metal compounds with lactam monomer in the polymerization medium or by prior reaction of the metal or metal compound with a stoichiometric quantity of lactam monomer.

As in the case of the catalyst, promoters useful in the polymerization of a lactam and an epoxy component are those that have been or can be used in the anhydrous polymerization of lactams. The promoters that have been disclosed to be effective for this purpose include acylating agent such as acyl halides and anhydrides, isocyanates and compounds containing tertiary nitrogen having at least two of the three substituents on the nitrogen atom consisting of carbonyl, thiocarbonyl, sulfonyl, phosphonyl, thiophosphonyl, and nitroso radicals.

The latter class of suitable promoters mentioned in the preceding paragraph include compounds that are suitable as substitutes for the N-(aminocaproyl)caprolactam, or other lactam derivatives thereof, that serve as the regenerating specie in a lactam anionic polymerization. This class of promoters are defined as follows:

$$A-\underset{\underset{R}{|}}{N}-B$$

where N is a tertiary nitrogen atom, i.e., devoid of any hydrogen atom attached thereto; A is an acyl radical selected from

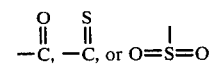

B is an acyl radical selected from

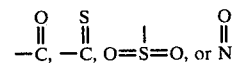

and R can be of the same or of general type as A or B; or a hydrocarbon radicals such as aryl, alkyl, aralkyl, alkaryl, cycloalkyl, etc; or a heterocyclic radical such as pyridyl, quinolyl, etc; or any of the aforementioned groups substituted with or containing additional radicals or groups such as carbonyl, N-substituted carbonyl, alkoxy, ether, sulfonyl, tertiary amino, etc; or any other noninterfering group which will not preferentially react with the lactam or which will not otherwise affect activity of the catalyst. At least two acyl groups must be attached to the tertiary nitrogen atom in order to activate at least one of the nitrogen-acyl group bonds sufficiently to break under the prevailing polymerization conditions. The radicals A and B can be attached together to form a ring system. Likewise, the radical A and the tertiary nitrogen atom can constitute a part of a ring system not including the radical B.

A preferred class of promoters having the aforesaid structure are the N-substituted imides that have at least two acyl groups attached directly to the tertiary nitrogen atom such as bis-acyllactams, N-substituted imides comprising cyclic imides of dicarboxylic acids, and N-substituted imides that have a multiplicity of the essential N,N-diacyl tertiary nitrogen atom groups. Another class of promoters are the N-acyl sulfonamides that are devoid of hydrogen atoms on the sulfonamide nitrogen atom, as well as disulfonamides, N-nitrosoamides, and N-nitrososulfonamides.

Specific examples of the promoters generally defined in the preceding paragraph include terephthaloyl biscaprolactam, caprolactam capped methylene diisocyanate N-acetyl-2-pyrrolidone, N-acetyl-epilson caprolactam, N-benzoyl-epsilon caprolactam, N-propionyl-W-caprylolactam, N-phenylsuccinimide, N-benzoylphthalimide, N,N',N''-trimethylester of isocyanuric acid, ethylene disuccinimide, N,N-diacetylmethylamine, N-acetyl-N-ethyl-p-toluenesulfonamide, N-methylsaccharin, N,N-di(p-toluenesulfonyl)aniline, N-nitroso-2-pyrrolidone, N-nitrososuccinimide, N,N-diacetylnitrosamine, and N-nitroso-N-methyl-benzenesulfonamide. U.S. Pat. No. 3,107,391 to Mottus et al. discloses the above-mentioned promoters in greater detail.

It should be understood that other materials can be added to the composition to improve properties thereof. Examples of such materials include fillers, pigments, stabilizers, and the like.

The reaction injection molding process for making solid nylon compositions involves mixing the epoxy component containing more than one free epoxy group with the promoter and one-half or any fraction of the lactam to be used in the process, to form mixture A. Mixture B is prepared by mixing the remaining lactam with the catalyst. The lactam used may have to be heated above its melting point to render it liquid. The melting point of capro-lactam, for instance, is about 160° F. Generally speaking, both mixtures will be maintained at a temperature in the range of about 70° to 100° C. to ensure that they remain in a liquid state. The mixtures are then metered into a mixing vessel where mixtures A and B are quickly and vigorously agitated to form mixture C. The volume ratio of mixture A to mixture B can be varied, however, in a preferred embodiment, it is in the range of 1/1 to 4/1. The above conditions should result in a pot life of mixture C in the mixing vessel of about 10 seconds to one minute.

The mold is maintained at a temperature of 100° to 200° C., preferably at 120° to 160° C. Mixture C is conveyed into the mold where chemical reaction takes place and the mixture cures or solidifies in a short period of time, preferably in less than 2 minutes and more preferably, in 30 to 90 seconds. After curing, the solid, molded composition is removed. In the mold, polymerization of the lactam and the epoxy component takes place and the system changes from a liquid to a gel and then undergoes a color change from clear to opaque, indicating solidification. Viscosity of the liquid mixture before injecting it into the mold is generally in the range of about 50 to 20,000 cps, preferably about 1500 cps, measured at 70° C.

The following examples will serve to further illustrate the practice of the present invention and the benefits derived therefrom.

EXAMPLE 1

This example demonstrates anionic polymerization of epsilon coprolactam and Kelpoxy epoxy component using phenyl magnezium bromide catalyst and terephthaloyl biscaprolactam promoter. Kelpoxy is an epoxy resin made from carboxyl terminated butadiene-acrylonitrile reactive liquid polymer and bisphenol A diglycidyl ether.

Caprolactam in amount of 50 parts by weight, 10 parts of weight of Kelpoxy epoxy component and 1 mole percent of terephthaloyl biscaprolactam promoter were mixed in reaction vessel A. In reaction vessel B were mixed 50 parts by weight of caprolactam and 1 mole percent of phenyl magnesium bromide catalyst. Vessels A and B were degassed by the use of vacuum to remove low volatiles after the mixtures were placed therein. Both vessels A and B were kept in a heated oil bath at about 80° C. to maintain caprolactam in a liquid state and both vessels were flushed with nitrogen to protect the catalyst. Contents of vessel B was then added to vessel A with vigorous mixing under a blanket of nitrogen and then immediately thereafter, contents of vessel A was poured into a preheated mold maintained at about 160° C. The liquid mixture added to the mold reacted chemically to a solid mass in about one-half minute and a solid 6"×6" object was extracted from the mold.

EXAMPLE 2

Ionic polymerization of additional samples 1 to 10 of caprolactam with other epoxy components was carried out by reaction injection molding process describe in Example 1 to determine reaction time and affect of Wallastonite filler on the reaction rate. Results of these polymerizations are summarized in Table I, below:

TABLE I

|  | 1 | 2 | 3 | 4 | 5 | 6 | 7 | 8 | 9 | 10 |
|---|---|---|---|---|---|---|---|---|---|---|
| Caprolactam, g. | 36 | → | → | → | → | → | → | → | → | → |
| Capped MDI, g. | — | — | — | — | 3.96 | 1.98 | → | → | → | → |
| TBC, g. | 3.0 | 3.0 | 3.0 | 3.0 | — | 1.48 | → | → | → | → |
| PhMg Br (3 molar), ml | 3.6 | → | → | → | → | → | → | → | → | → |
| Der 332, g. | 1.8 | — | — | — | — | — | — | — | — | — |
| Der 431, g. | — | 1.8 | — | — | — | — | — | — | — | — |
| Der 438, g. | — | — | 1.8 | — | — | — | — | — | — | — |
| Der 732, g. | — | — | — | 1.8 | — | — | — | — | — | — |
| Kelpoxy | — | — | — | — | 1.8 | 3.6 | 7.2 | 3.6 | 3.6 | 3.6 |
| Wallastonite A-189, g. | — | — | — | — | — | — | — | 3.6 | 7.2 | 24 |
| Mold Temp., °C. | 160 | → | → | → | → | → | → | → | → | → |
| Reaction Time, min. | ½ | ½ | 2½ | ½ | ½ | 5/12 | ½ | ½ | ½ | ½ |

TBC in the above table represents terephthaloyl biscaprolactam promoter; PhMgBr is phenyl magnesium bromide catalyst; Der 332 is a bisphenol A derived epoxy resin; Der 431 and 438 are novolac derived epoxy resins; Der 732 is a polypropylene oxide derived epoxy resin; Kelpoxy epoxy resin is defined in Example 1; Wallastonite is a calcium silicate filler in the form of needle-like fibers; and Reaction Time is the time in the mold for the liquid mixture to cure.

Table I, above, presents rates of lactam polymerization in the presence of various epoxy resins and a filler, in certain cases. It is apparent that as long as appropriate promoters and catalysts are used, many different types of epoxy resins can be added without inhibiting the reaction rate. It is also important to note that a filler and an epoxy resin can be added to a lactam polymerization recipe and still obtain extremely fast reaction rates.

EXAMPLE 3

Additional samples of nylon compositions 11 to 18 were prepared as described in Example 1 which were then subjected to physical testing. Composition 11 is a control in that it represents polymerization of caprolactam in presence of a catalyst and a promoter but in absence of an epoxy component. The amounts of the various components and results of the tests are set forth in Table II, below:

TABLE II

| | 11 | 12 | 13 | 14 | 15 | 16 | 17 | 18 |
|---|---|---|---|---|---|---|---|---|
| Caprolactam, g | 100 | 100 | 100 | 100 | 100 | 100 | 100 | 100 |
| PMg Br (3 molar), ml | 3.6 | → | → | → | → | → | → | → |
| TBC, g. | 4.3 | → | → | → | → | → | → | → |
| Der 332, g. | — | — | — | — | — | — | — | 10 |
| Der 431, g. | — | — | — | — | — | — | 10 | — |
| Der 542, g. | — | 10 | — | — | — | — | — | — |
| Der 732, g. | — | — | — | — | — | 10 | — | — |
| Kelpoxy, g. | — | — | 10 | 15 | 20 | — | — | — |
| Reaction Time, sec. | 20 | 25 | 30 | 30 | 60 | 40 | 15 | 20 |
| HDT @ 264 psi, °C. ASTM D-648 | 65 | 58 | 53 | 51 | 48 | 55 | 58 | 50 |
| Izod, Notched ¼" bar. ft-lb/in ASTM D-256 | 0.6 | 0.8 | 2.8 | 3.4 | 2.6 | 2.0 | 0.6 | 0.4 |
| Drop Wt. Impact ¼" Dart | 40 | 250 | >320 | >320 | >320 | >320 | 40 | — |
| Flexural Modulus psi × 10³ (MPa) ASTM D-790 | 240 (1655) | 330 (2276) | 245 (1690) | 246 (1697) | 160 (1163) | 185 | 263 | 116 |
| Hardness-Shore D | 78 | 81 | 78 | 78 | 76 | 76 | 78 | 78 |

In the above table, Der 542 is a tetrabromo bisphenol A derived epoxy that can impart fire retardant property to resulting nylon compositions. The other ingredients have been identified previously.

Although the use of neat epoxy resins, i.e., Der 332 and Der 431, does not produce the desired impact improvement since their presence makes nylon 6 composition even more brittle, based on the tabulated results, nevertheless, it has been demonstrated that the epoxy resin does not appear to inhibit polymerization rate of a lactam and can serve as a vehicle to introduce desirable constituents into the polymer structure. For instance, Der 732 resin, a polypropylene oxide derived diepoxy, greatly improved the impact strength of nylon 6 composition, and Der 542, a tetrabromo bisphenol A derived diepoxide, appeared to increase both stiffness and drop weight impact resistance. The Kelpoxy resin, a modified epoxy made from carboxyl terminated reactive liquid polymer and bisphenol A diglycidyl ether, also demonstrated its merits in increasing impact demonstrated its merits in increasing impact properties of the nylon 6 composition.

It was earlier stated that the compositions described herein unexpectedly provide improved impact strength without detrimentally affecting flexural modulus. This is confirmed by data given in Table II for Samples 13 and 14 where a substantial improvement in impact strength is shown while also showing a slight improvement in flexural modulus where a substantial reduction in flexural modulus would normally be expected.

I claim:

1. A process comprising the steps of mixing liquid mixture A and liquid mixture B to form liquid mixture C, introducing liquid mixture C into a mold maintained at an elevated temperature wherein a chemical reaction takes place to convert the liquid to a solidified mass, said mixture A comprising a lactam, an epoxy component having at least one free epoxy group per molecule, and a promoter that can be used in lactam polymerization; said mixture B comprising a lactam and a catalyst that can be used in lactam polymerization; amounts of the catalyst and promoter being sufficient to catalyze and to initiate the anionic polymerization, amount of said lactam being at least 75% and up to about 98% and amount of said epoxy component being up to about 25% but more than about 2%, based on the total weight of lactam and epoxy component used.

2. Process of claim 1 wherein said mixtures A and B are at a temperature sufficiently high to maintain them in liquid state, mixing of mixtures A and B is done in the respective weight ratio in the range of 1/1 to 4/1, and the mold is maintained at a temperature sufficiently high to promote the chemical reaction of the lactam and the epoxy component whereby a polymerized solidified object is produced is less than about 2 minutes in the mold.

3. Process of claim 2 wherein mixtures A and B are at a temperature in the range of about 70° to 100° C.; the mold is maintained at a temperature in the range of about 100° to 200° C.; the lactam is selected from the group defined by the formula

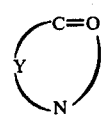

where Y is an alkylene group containing 3 to 14 carbon atoms unsubstituted or substituted with at least one substituent that does not inhibit or adversely affect the polymerization reaction; said epoxy component is selected from epoxy compounds and polymeric epoxy resins.

4. Process of claim 3 wherein Y contains 5 to 11 carbon atoms and said epoxy component containing physical property enhancing constituents is obtained by prereacting said epoxy component with an impact modifying functionally terminated reactive liquid polymer selected from carboxyl terminated and amine terminated liquid polymers, or by reacting a hydroxyl-containing material having a fire-retardant moiety with an epihalohydrin to form said epoxy component.

5. Process of claim 3 wherein said epoxy component is selected from materials prepared by reacting an epihalohydrin with an hydroxyl-containing compound in presence of a basic catalyst, and materials prepared by epoxidation of olefins using peroxides or peracids; and wherein Y of the lactam formula contains 5 to 11 carbon atoms.

6. Process of claim 5 wherein said hydroxyl-containing compound is selected from bisphenols having a group intermediate the two phenyl radicals selected from alkylene and alkylidene radicals containing 1 to 6 carbon atoms unsubstituted and substituted with at least one halogen.

7. Process of claim 3 wherein said epoxy component is selected from resins prepared by reacting an epihalohydrin with a novolac, resins prepared by reacting an epihalohydrin with bisphenol A, and resins prepared by reacting a hydroxyl-containing compound with polypropylene oxide.

8. Process of claim 4 wherein said epoxy component compounds contains impact modifying constituents made from a functionally terminated reactive liquid polymer and a diepoxide wherein the functional group of the liquid polymer is reactive with the epoxy group.

9. process of claim 4 wherein said hydroxyl-containing material having a fire-retardant moiety is brominated bisphenol A.

10. Process of claim 4 wherein said lactam is caprolactam, said catalyst is selected from Grignard compounds, said promoter is selected from bis-acyllactams and lactam capped diisocyanates, said mixture C having a pot life of about 10 seconds to 1 minute and solidifies in less than about 90 seconds in the mold maintained at a temperature of about 120° to 160° C.

11. Composition of matter produced by reacting by anionic polymerization a liquid mixture A of a lactam, an epoxy component having at least one free epoxy group per molecule, and a catalyst that can be used in lactam polymerization with a liquid mixture B of a lactam and a catalyst that can be used in lactam polymerization whereby a solidified mass is produced, amount of the lactam being at least 75% and up to about 98% and amount of the epoxy component being up to about 25% but more than about 2%, based on the weight of total lactam and epoxy component used.

12. Composition of claim 11 wherein mixtures A and B are reacted in the respective weight ratio of 1/1 to 4/1 at a temperature of about 100° to 200° C. and solidify in less than 2 minutes, said lactam is selected from the group defined by the formula

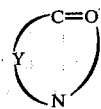

where Y is an alkylene group containing 3 to 14 carbon atoms unsubstituted or substituted with at least one substituent that does not inhibit or adversely affect the polymerization reaction; said epoxy component is selected from epoxy compounds and polymeric epoxy resins.

13. Composition of claim 12 wherein said epoxy component is selected from materials prepared by reacting an epihalohydrin with an hydroxyl-containing compound in presence of a basic catalyst, and materials prepared by epoxidation of olefins using peroxides or peracids; and wherein Y of the lactam formula contains 5 to 11 carbon atoms.

14. Composition of claim 13 wherein said hydroxyl-containing compound is selected fom bisphenols having a group intermediate the two phenyl radicals selected from alkylene and alkylidene radicals containing 1 to 6 carbon atoms unsubstituted and substituted with at least one halogen.

15. Composition of claim 12 wherein said epoxy component is selected from resins prepared by reacting an epihalohydrin with a novolac, resins prepared by reacting an epihalohydrin with bisphenol A, and resins prepared by reacting a hydroxyl-containing compound with polypropylene oxide.

16. Composition of claim 12 wherein said epoxy component is prereacted with an impact modifying constituent selected from carboxyl terminated and amine terminated reactive liquid polymers.

17. Composition of claim 15 wherein said lactam is caprolactam, said catalyst is selected from Grignard compounds, and said promoter is selected from bis-acyllactams.

18. Composition of claim 12 wherein said epoxy component is obtained by reacting brominated bisphenol A with an epihalohydrin.

* * * * *

UNITED STATES PATENT AND TRADEMARK OFFICE
CERTIFICATE OF CORRECTION

PATENT NO. : 4,400,490   Page 1 of 2
DATED : August 23, 1983
INVENTOR(S) : Wei-Yeih W. Yang It is certified that error appears in the above-identified patent and that said Letters Patent are hereby corrected as shown below:

Claim 3 Line 50 -- 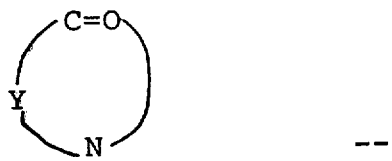 --

Should Read " 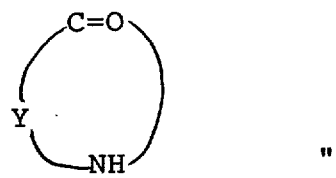 "

Claim 12 Line 10 -- 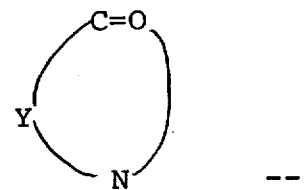 --

UNITED STATES PATENT AND TRADEMARK OFFICE
CERTIFICATE OF CORRECTION

PATENT NO. : 4,400,490

DATED : August 23, 1983

INVENTOR(S) : Wei-Yeih W. Yang

Page 2 of 2

It is certified that error appears in the above-identified patent and that said Letters Patent is hereby corrected as shown below:

Should Read " 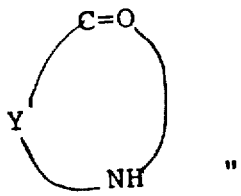 "

Signed and Sealed this

Seventeenth Day of December 1985

[SEAL]

Attest:

DONALD J. QUIGG

Attesting Officer

Commissioner of Patents and Trademarks